United States Patent
Maguire et al.

(10) Patent No.: US 8,968,912 B2
(45) Date of Patent: Mar. 3, 2015

(54) METHOD AND APPARATUS FOR MANUFACTURING A BATTERY FOR A VEHICLE

(75) Inventors: Patrick Daniel Maguire, Ann Arbor, MI (US); Giriraj Srinivasan, Troy, MI (US); Steven F. Chorian, Canton, MI (US); Kanchana Pentapati, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 347 days.

(21) Appl. No.: 13/411,770

(22) Filed: Mar. 5, 2012

(65) Prior Publication Data

US 2013/0164592 A1 Jun. 27, 2013

Related U.S. Application Data

(60) Provisional application No. 61/578,805, filed on Dec. 21, 2011.

(51) Int. Cl.
*H01M 6/42* (2006.01)
*H01M 6/46* (2006.01)
*H01M 2/10* (2006.01)
*H01M 10/647* (2014.01)

(52) U.S. Cl.
CPC ........ *H01M 2/1061* (2013.01); *H01M 10/5032* (2013.01)
USPC .......................................... 429/159; 429/152

(58) Field of Classification Search
CPC . H01M 2/1016; H01M 2/1061; H01M 10/50; H01M 10/5016; H01M 10/5032; H01M 10/5048
USPC .................................... 429/152, 159
See application file for complete search history.

(56) References Cited

U.S. PATENT DOCUMENTS

| | | | |
|---|---|---|---|
| 6,197,446 B1 | 3/2001 | Fukuda et al. | |
| 6,312,851 B1 | 11/2001 | Fukuda et al. | |
| 6,761,992 B1 | 7/2004 | Marukawa et al. | |
| 2007/0122695 A1* | 5/2007 | Kim et al. | 429/152 |
| 2011/0177368 A1 | 7/2011 | Maguire | |
| 2011/0262797 A1* | 10/2011 | Kim | 429/149 |

* cited by examiner

*Primary Examiner* — Jonathan Jelsma
(74) *Attorney, Agent, or Firm* — David B. Kelley; Brooks Kushman P.C.

(57) ABSTRACT

A battery module assembly and method of assembling a battery. The battery module assembly includes a plurality of modules in which a plurality of battery cells are preassembled. The modules are compressed by end plates that are held together under compression by a plurality of linking members. The end plates may include a protrusion that applies pressure to the central portion of the battery cells within the modules. The central portion of the end plates may be partially spherical, partially cylindrical or a flat surface.

15 Claims, 5 Drawing Sheets

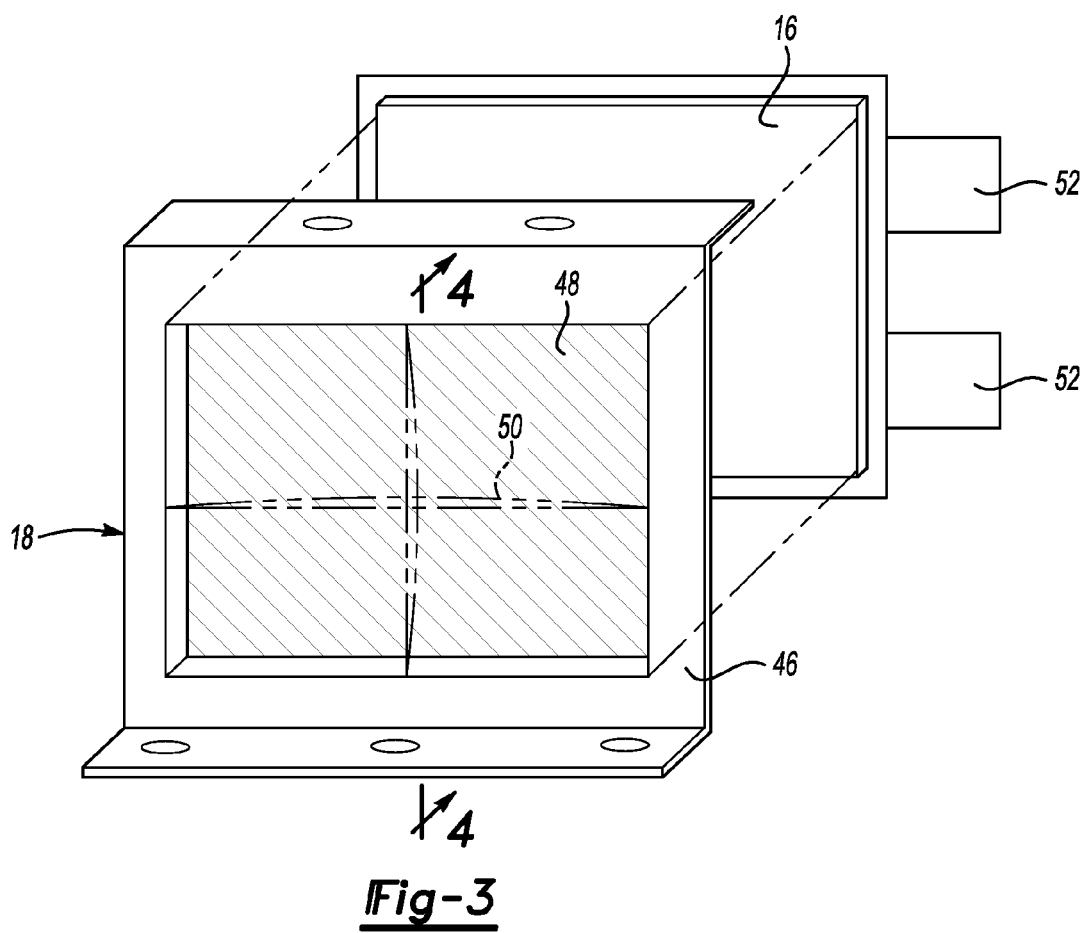
Fig-3
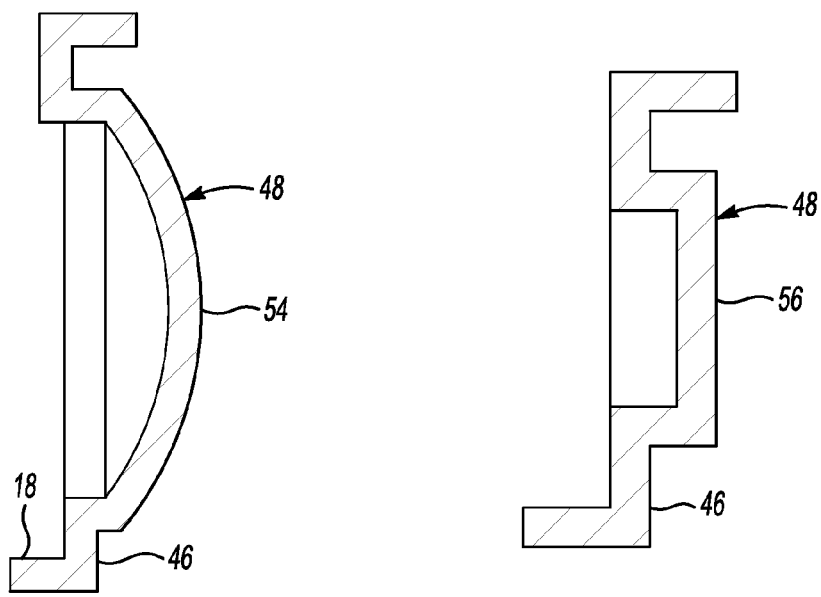
Fig-4
Fig-5

METHOD AND APPARATUS FOR MANUFACTURING A BATTERY FOR A VEHICLE

CROSS-REFERENCE TO RELATED APPLICATIONS

This application claims the benefit of U.S. provisional Application No. 61/578,805, filed Dec. 21, 2011, the disclosure of which is incorporated in its entirety by reference herein.

TECHNICAL FIELD

This disclosure relates to a method of manufacturing a battery for a vehicle having an electrically powered traction motor and to components of the battery assembly.

BACKGROUND

High voltage (HV) battery systems for vehicles are manufactured by assembling battery cells, electrical connections and cooling equipment to provide a dense package with a minimum of open space. Pouch cells may be used in high volume, production HV battery systems. Pouch cells are generally planar layered ionic cells, such as lithium ion cells, that may be sandwiched between structural and/or thermal conditioning layers. A large number of cells are stacked in one or more rows and retained in a compressed array.

The rack, or tray, retaining the array of batteries should be robust to securely retain the battery cells in the vehicle. In addition, the battery cells may be assembled as a sub-assembly off line prior to being assembled to the vehicle. Handling a large, horizontally arranged stack of cells presents problems during assembly because the stack may bend or shift when moved. The cell array may be wired on one side of the stack of cells and may have cooling component parts on the opposite side. It is difficult to electrically connect the cells on one side of a stack of cells if the stack of cells is located close to an adjacent stack of cells. It is also difficult to connect the stack of cells to a cooling system if several batteries are stacked together in a closely spaced arrangement.

Batteries expand and contract during charging and discharging. Pouch cells may develop gas expansion pockets when charged if the cells are not kept under pressure. The gas expansion pockets reduce battery efficiency.

The disclosed battery module assembly and method of manufacturing a battery are directed to addressing the above problems and other problems as summarized below.

SUMMARY

The disclosed embodiments are of a modular battery array that offers high density packaging and is easy to assemble in a repeatable process. The method and apparatus also provide a simple, robust and effective cell compression system.

According to one aspect of the present invention, a battery module assembly is provided in which a plurality of cells are stacked into a module pack having end walls. A plurality of modular packs are assembled to a base linking member that extends between two end plates. One or more linking members extend between the two end plates on the opposite side of the module packs from the base linking member. The base linking member and one or more opposite linking members hold the module packs together in compression and space the end plates a predetermined distance apart. The linking members may be straps, rods, bands or pipes that are capable of being used to connect the end plates.

According to other aspects of the battery module assembly, the end plates may each have a frame portion extending about an outer edge of the end plates and a central portion within the frame. The central portion of each end plate protrudes inwardly towards the other end plate to compress the battery cells between the central portion of the end plates on opposite sides of the assembly. The central portion may be defined by a partially cylindrical curved surface that protrudes inwardly toward the other end plate to compress the battery cells between the central portions of the end plates on opposite sides of the assembly. Alternatively, the central portion may be defined by a partially spherical curved surface that protrudes inwardly toward the other end plate to compress the battery cells between the central portion of the end plates on opposite sides of the assembly.

According to other aspects of the disclosure as it relates to the battery assembly, the linking members may have a first set of fastener receiving locations that are aligned with a second set of fastener receiving locations on the end plates. A fastener may be installed in the first and second fastener locations to set the predetermined distance between the end plates.

According to another aspect of the disclosure, a battery assembly is provided for a vehicle that includes an electrically powered traction motor. The assembly comprises a battery receptacle installed on the vehicle. A first modular array of battery cells is arranged in a row with a first and second end plate assembled to opposite ends of the row of battery cells. A first plurality of linking members secures the first and second end plates together. A first set of electrical connections to each of the battery cells is provided on one side of the first modular array. A second modular array of battery cells is also arranged in a row with a third and fourth end plate being assembled to opposite ends of the row of batteries. A second plurality of linking members secures the third and fourth end plates together. A second set of electrical connections to each of the battery cells is provided on one side of the second modular array. The first and second modular arrays are assembled to the battery receptacle with the first and second set of electrical connections facing each other.

According to other aspects of the disclosure as it relates to the battery assembly for a vehicle, a cooling system may be provided for the battery cells that is attached to the first and second modular arrays on the sides of the modular arrays that face away from the side including the electrical connections. The cooling system may further comprise at least one cooling tube mechanically attached to the battery cells to facilitate the transfer of thermal energy between the cooling system and the battery cells. The cooling system is in fluid flow communication with the cooling tube on one side of the modular array.

The battery assembly may also include a first plurality of linking members that are secured to a flange formed on the end plates that extends in the same plate as the linking members and is of the same height as the end plates. The second plurality of linking members may have an offset flange that is connected to the linking member by an intermediate portion. The intermediate portion is perpendicular to the linking member and the offset flange. A plurality of stiffening ribs may be formed at a corner defined by the intermediate portion and the offset flange. The offset flanges are secured to the flange formed on the end plate that extends in the same plane as the offset flange and are disposed at a lower height than the linking members.

According to another aspect of the disclosure, a method of manufacturing a battery for a vehicle is disclosed. The method comprises stacking a plurality of pouch cells in a module. A pair of end plates are assembled to at least one base linking member. A plurality of the modules are stacked on the at least one base linking member to fill the space between the end plates. At least one top linking member is attached between the end plates to retain the two end plates at a predetermined distance apart. The pouch cells are connected together electrically on a first set of the plurality of modules. At least some of the pouch cells are connected to a cooling system interface on a second side of the plurality of modules from the first side that is opposite the first side. A plurality of modules are loaded into a battery holder in the vehicle after assembling the modules between the pair of end plates, stacking the modules on the base linking member, attaching the top linking member between the end plates, connecting the cells together electrically, and connecting the pouch cells to the cooling system interface.

According to other aspects of the method, the modules may have tabs that define slots wherein during the loading step, a tool is provided that includes hooks that extend from the tool and are oriented to be received in the slots defined by the tabs in the modules. The method further comprises lifting the modules that are supported by the tool from above the modules.

The battery holder may be a tray that includes a plurality of weld studs. The end plates define slots that are elongated in the direction that the linking members extend between the end plates. In the method, the step of loading the plurality of modules onto the battery holder may further comprise aligning the slots of the end plates with the weld studs on the tray to retain the modules on the tray.

The above aspects of the disclosure and other aspects will be better understood in view of the attached drawings and the following detailed description of the illustrated embodiments.

BRIEF DESCRIPTION OF THE DRAWINGS

FIG. 3 is a diagrammatic perspective view of an end plate and battery cell in an exploded perspective view;

FIG. 4 is a cross-sectional view taken along the line 4-4 in FIG. 3;

FIG. 5 is a cross-sectional view of an alternative embodiment of an end plate similar to FIG. 4;

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
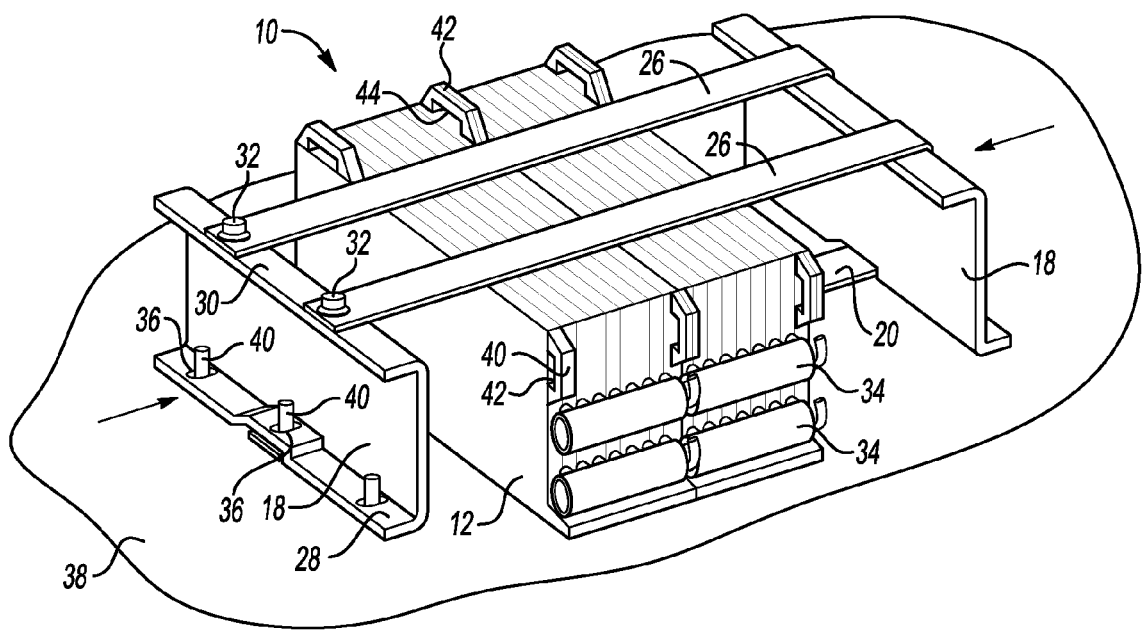
FIG. 1 is a perspective view of a battery module assembly including a plurality of module packs assembled between a pair of end plates that are connected by a plurality of linking members.

Referring to FIG. 1, a battery module assembly 10 is provided for supporting and compressing a plurality of battery modules 12. The battery modules 12 include a plurality of battery cells 16. The battery cells are ionic "pouch-type" cells that are stacked horizontally within the modules 12. The battery cells may be lithium ion or other electrochemical battery cells. The modules 12 are retained between a pair of end plates 18 that apply a compressive force, as indicated by the arrows in FIG. 1, on the sides of the modules 12 and, in turn, on the sides of the battery cells 16. A bottom linking member 20 connects the bottom portion of end plates 18 together. A pair of top linking members 26 are secured to the top of the end plates 18. The end plates 18 include a bottom flange 28 that extends outwardly on the end plates 18. A top flange 30 is also provided on each of the end plates and may extend either outwardly, as shown on the left side of FIG. 1, or may extend inwardly, as shown the end plate on the right side of FIG. 1. Cooling pipes 34 may be provided that extend on the outer sides of the battery module assembly 10.

Figure 2:
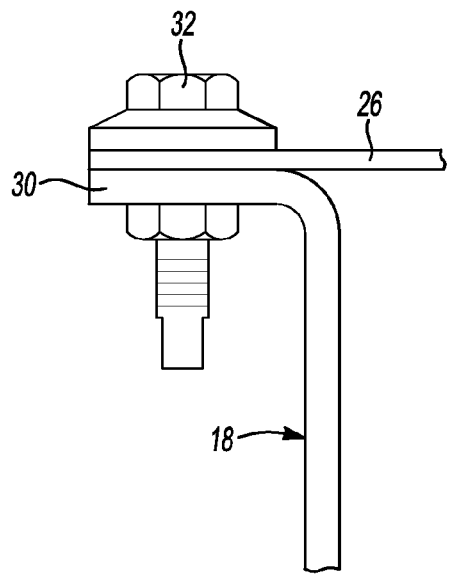
FIG. 2 is a fragmentary rear elevation view of an end plate having an outwardly extending flange connected to a linking member by a fastener.

Referring to FIG. 2, the left side flange 30 of the end plate 18 is shown connected to the top linking members 26 by a fastener 32. The fastener 32 may be a conventional nut and bolt fastener, a bolt with a weld nut, or the like.

Referring to FIG. 1, the distance between the end plates 18 is set by the length of the linking members 26 and 20 that are attached by fasteners 32 that fix the distance between the end plates 18. The fasteners may be a combination of nuts, bolts, specialized studs or weld nuts. The end plates may be placed in a fixture during assembly of the battery module assembly that applies a compressive force against the plurality of modules 12. The fasteners 32 retain the modules 12 under compression when they are assembled to the end plate 18.

Referring to FIG. 3, an end plate 18 is shown with a battery cell 16 in an exploded perspective view. The end plate includes a frame portion 46 that extends about the periphery of a central portion 48. The central portion 48 may include a partially spherical surface 50, as indicated by the phantom lines in FIG. 3. The spherical surface 50 may be a parabolic shape or other concave surface that can apply a compressive force against the battery cells between the end plates 18 in the central portion 48. The spherical surface 50 is provided to resist expansion of gases within the cells 16 when the cells are charged.

Referring to FIG. 4, a cross section is taken through end plate 18 to show the curvature of the surface 50. It should be understood that the surface 50 could also be a partially cylindrical surface. In either case, the curvature could appear to have the same arcuate shape shown in FIG. 4. It should be understood that the curve of the cylindrical surface may be generated about either a horizontal axis or a vertical axis.

FIG. 5 is a cross-sectional view similar to the cross section taken in FIG. 4 to illustrate another embodiment wherein the central portion 48 is provided as a flat surface 56 that applies a compressive force evenly over the entire surface of the battery cells 16 shown in FIG. 3.

Figure 6:
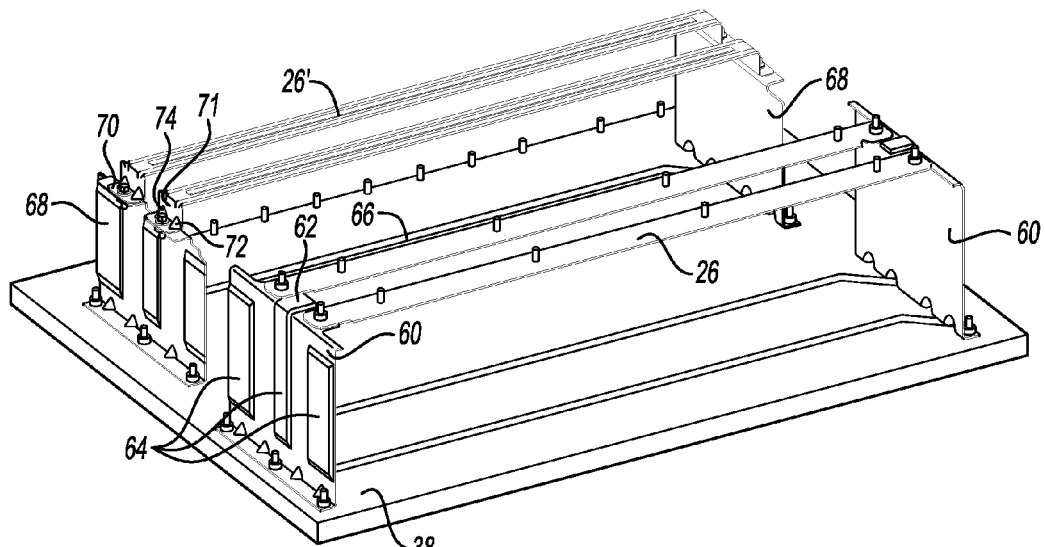
FIG. 6 is a perspective view of a battery tray or holder including two different types of end plates that are connected together by two different types of linking members.
Figure 7:
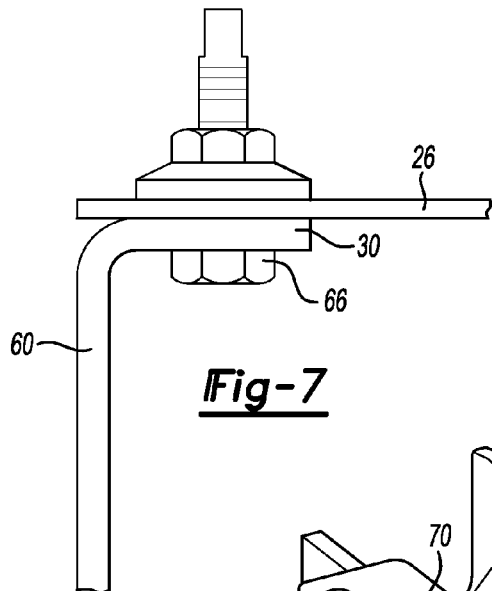
FIG. 7 is a fragmentary rear elevation view of an end plate having an inwardly extending flange connected to a linking member by a fastener.

Referring to FIG. 6, a battery tray 38 is shown with two alternative constructions of end plates 60, 68 and top linking members 26, 26'. A pair of full height end plates 60 having inwardly extending flanges 62 is shown in the foreground of FIG. 6. The end plates 60 may include stiffening ribs 64 that reinforce the end plate 60 as required. As shown in FIGS. 6 and 7, a weld bolt 66 may be inserted in an inverted orientation to secure the top flange 30 of the end plate 60 to a top linking member 26.

Figure 8:
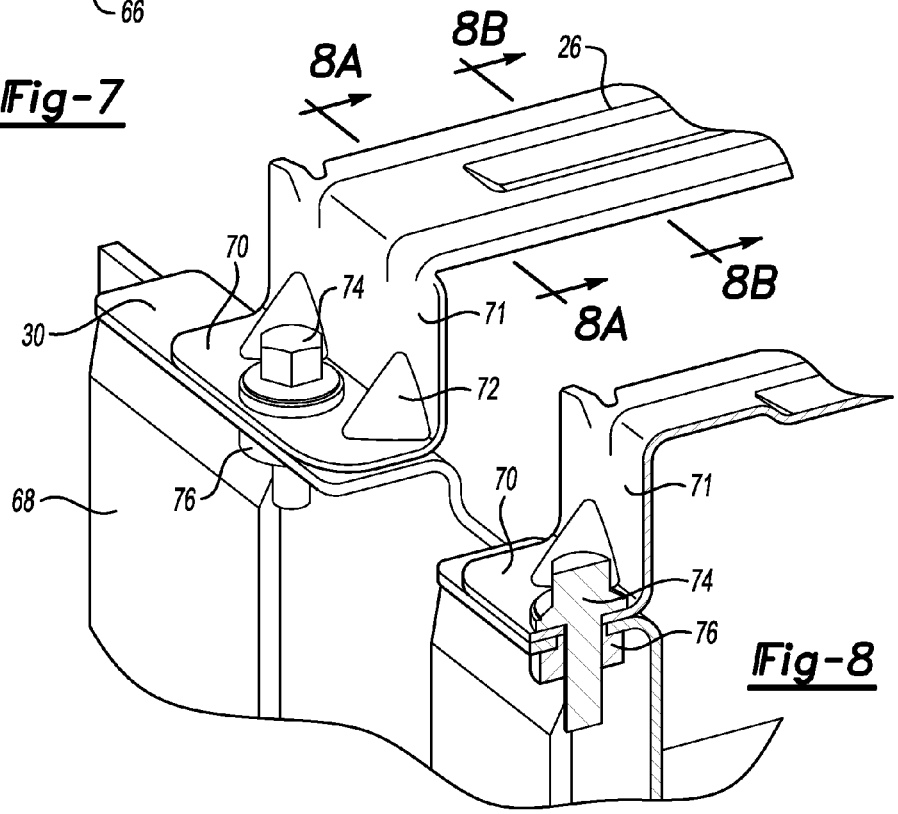
FIG. 8 is a fragmentary perspective view partially in cross-section showing an alternative embodiment of an end plate having an outwardly oriented flange connected to a linking member having an offset flange with reinforcing ribs.

Referring to FIGS. 6 and 8, a pair of low profile end plates 68 are shown in the background area of FIG. 6. The low profile end plates 68 are connected to top linking member 26' that includes an intermediate portion 71 that extends downwardly from the top linking member 26' to an offset flange 70. Stiffening ribs 72 are provided to stiffen the offset flanges 70 and intermediate portion 71. A weld bolt 74 and nut 76, or the like, may be used to secure the offset flanges 70 of the top linking members 26 to the top flange 30 of the end plate 68.

Figure 8A:
FIGS. 8A and 8B are cross sections of one of the top linking members taken along the lines 8A-8A and 8B-8B in FIG. 8.
Figure 8B:
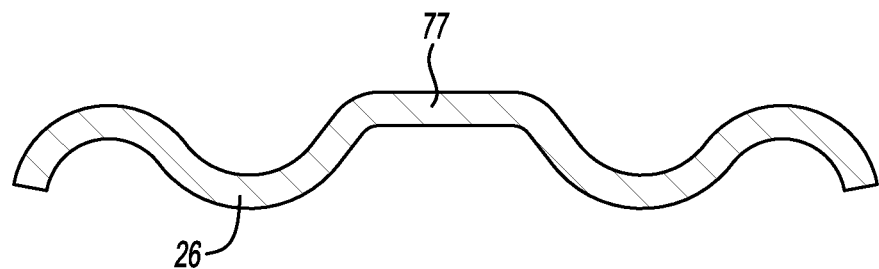

Referring to FIGS. 8A and 8B, cross sections of one of the top linking members 26 are taken along the lines 8A-8A and 8B-8B in FIG. 8. In FIG. 8A the linking member 26 does not feature a reinforcing rib 77. In FIG. 8B the linking member 26 includes a reinforcing rib 77. The reinforcing rib 77 is provided to stiffen the linking member 26.

Figure 9:
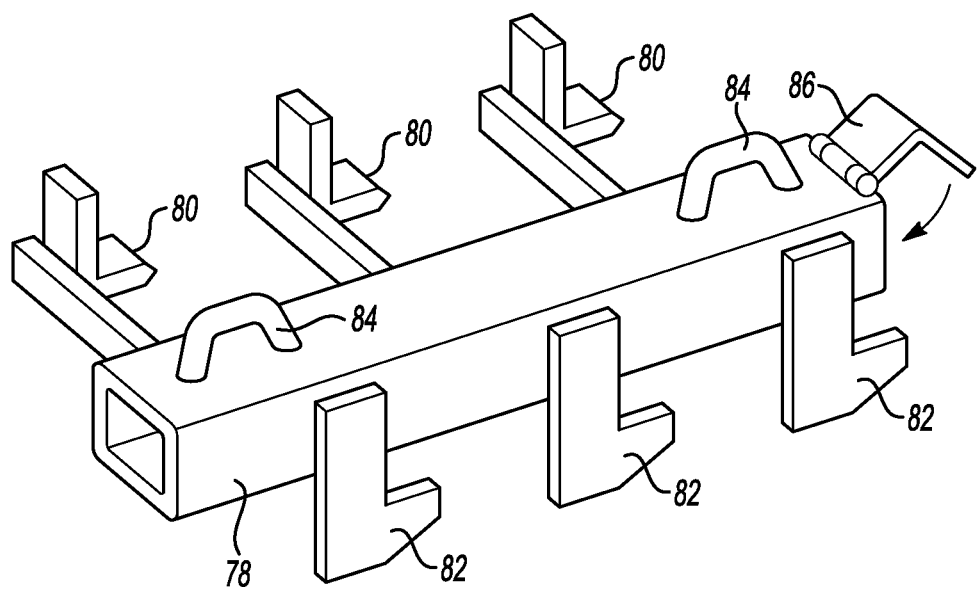
FIG. 9 is a perspective view of a tool that may be used to lift the array of a plurality of modular battery packs for assembly to a battery holder or tray.

Referring to FIG. 9, a tool is shown that may be used to facilitate carrying the battery module assembly 10 from a sub-assembly location to be loaded onto the battery tray 38 as a unit. The battery module assemblies 10 are assembled so that all of the wiring connections to the contact tabs 52 (shown in FIG. 4) may be completed at a sub-assembly location so that the battery cells 16 are conductively connected prior to being assembled to the battery tray. High voltage bus bar connections and electrical sensor wiring may also be assembled at a sub-assembly location. The main high voltage connections may not be made at the sub-assembly location if they are accessible in the completed battery assembly to avoid handling a high voltage connectors and wires for a heavy array of modules. The sides of the battery cells 16 that are wired together are assembled to the battery tray 38 in a face-to-face orientation with the battery cell wiring in the central area of the battery tray 38.

According to the method of manufacturing a battery for a vehicle, a plurality of pouch battery cells 16 are stacked into a module 12. A pair of end plates 18 is attached to at least one bottom linking member 20 and then a plurality of the modules 12 is assembled onto the bottom linking member 20 between the end plates 18. Once all of the modules 12 are installed on the bottom linking member 20 between the end plates 18, at least one top linking member 26 is attached between the end plates 18 to retain the two end plates 18 at a predetermined distance apart. The top linking members 26 are normally attached to the assembly when the end plates 18 are subjected to a compressive pressure by an assembly fixture. The battery cells 16 may then be connected together electrically on a first side of a plurality of modules 12. At least some of the battery cells 16 may be attached to a cooling system interface, or cooling pipes 34, on a second side of the plurality of modules 12 that are opposite the first side. The plurality of modules 12 may be loaded into a battery holder 38, or tray, in the vehicle after assembling the modules 12 between the pair of end plates 18, stacking the modules 12 on the bottom linking member 20, attaching the top linking member 26 between the end plates 18, connecting the battery cells 16 together electrically and connecting the battery cells 16 to the cooling system interface 34.

The tool shown in FIG. 9 includes a bar 78 that is attached to a plurality of top hooks 80 and a plurality of end hooks 82. The bar 78 may be provided with eyelet loops 84 that may be used to lift the bar 78 and battery module assembly 10 from the sub-assembly location to be installed on the battery tray 38, or other holder, provided in the vehicle. A latch 86 may be provided to lock the battery module assembly 10 into engagement with the top hooks 80 and end hooks 82.

Figure 10:
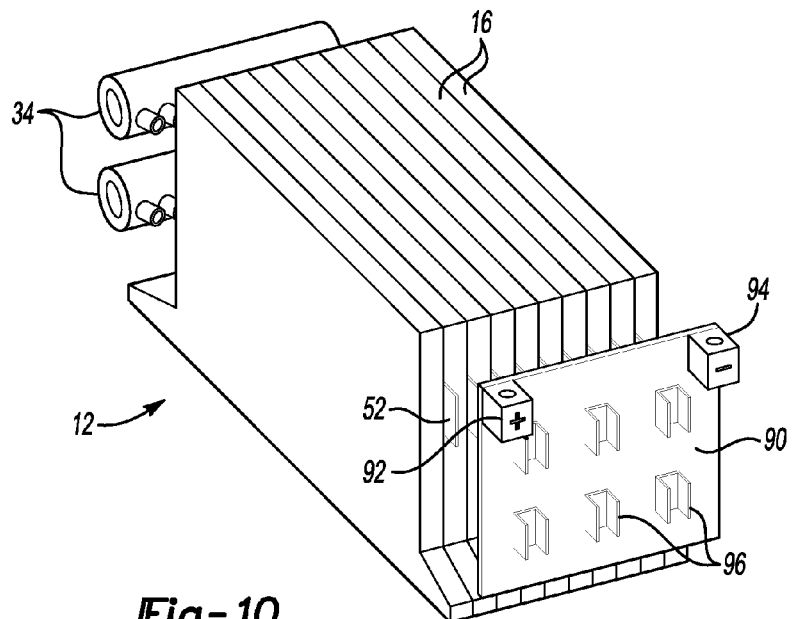
FIG. 10 is a diagrammatic perspective view of a battery module assembly without the end frames and with the terminal board exploded from the front of the module.

Referring to FIG. 10, a single module is shown with the end plates 18 (shown in FIG. 1) removed from the plurality of battery cells 16. the battery cells each have contact tabs that are connected electrically to provide the desired voltage between the positive module terminal 92 and the negative module terminal 94. A plurality of control terminals 96 are provided on the terminal board 90 that are used to connect the module 12 to a controller that is used to sense and monitor the functioning of the module 12. Tubular portions of the cooling system 34 are shown on the opposite side of the module relative to the terminal board 90.

Figure 11:
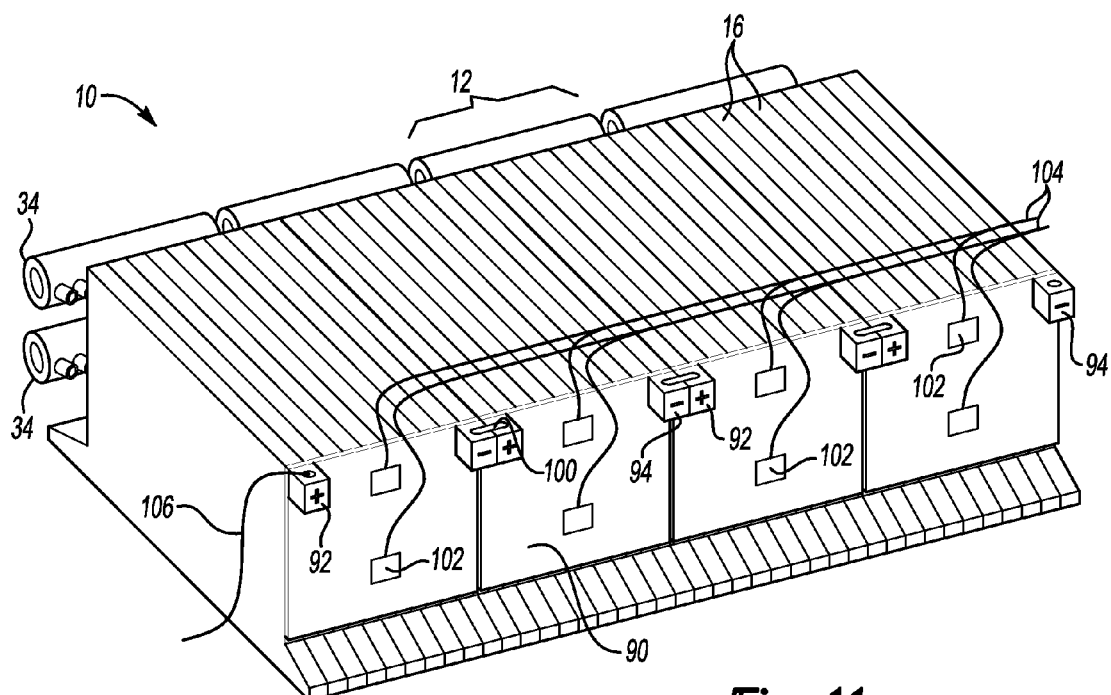
FIG. 11 is a diagrammatic perspective view of a plurality of battery modules assembled together without the end frames, with the terminal boards attached to the front of the modules and with the terminal boards connected together by high voltage wires and to the control wires.

Referring to FIG. 11, a simplified view is provided of an array of modules 12 that each include a plurality of battery cells 16 that may make up a battery module assembly 10. The positive terminals 92 and negative terminals 94 are connected between modules 12 by high voltage buss bars. Control connectors 102 are shown connected to the terminal boards 90. In FIG. 11 only two connectors 102 are illustrated but any number could be provided depending upon the number of sensors and control requirements. For example, in FIG. 10 six control terminals 96 are illustrated that would require six control connectors 102. The end most positive terminals 92 and negative terminals 94 are connected to high voltage wires 106 that provide power to the vehicle.

The high voltages wires 106, high voltage buss bars and control wires 104 may be attached before the battery assembly is installed in the vehicle to provide easy access. However, the high voltage wires may be connected after assembly to a vehicle if the connection points are accessible in the completed system. Handling high voltage wires 106 after being attached to the array of modules 12 adds weight and handling the entire assembly with the high voltage wires may be avoided if they are attached after installation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A battery module assembly comprising:
   linking members;
   two end plates that include a frame portion and a central portion defined by a partially spherically curved surface that spans the frame portion and protrudes inwardly towards the other end plate, the endplates being connected by the linking members; and
   a plurality of module packs assembled between the end plates are compressed between the central portions of the endplates on opposite sides of the assembly.

2. The battery module assembly of claim 1 wherein the linking members include first and second top linking members that have a first set of fastening locations that are aligned with a second set of fastening locations on the end plates, wherein the top linking members are secured to the end plates at the first and second fastening locations to establish a predetermined distance between the end plates.

3. The battery assembly of claim 2 wherein the predetermined distance is selected to apply a compressive force on the plurality of module packs.

4. A battery assembly for a vehicle, the assembly comprising:
   a battery receptacle installed on the vehicle;
   a first modular array of battery cells arranged in a first row, first and second end plates assembled to opposite ends of the first row of battery cells, the first and second end plates each having a frame portion and a central portion defined by a partially spherical surface that spans the frame portion and protrudes inwardly towards the other end plate, a first plurality of linking members extending between and securing the first and second end plates together, a first set of electrical connections to each of the battery cells on one side of the first modular array;
   a second modular array of battery cells arranged in a second row, third and fourth end plates assembled to opposite ends of the second row of battery cells, the third and fourth end plates each having a frame portion and a central portion defined by a partially spherical surface that spans the frame portion and protrudes inwardly towards the other end plate, a second plurality of linking members extending between and securing the third and fourth end plates together, a second set of electrical connections to each of the battery cells on one side of the second modular array, wherein the first and second modular arrays are assembled to the battery receptacle with the first and second set of electrical connections facing each other.

5. The battery assembly of claim 4 further comprising a cooling system for the battery cells that is attached to each of the first and second modular arrays on a side of the modular array that faces away from an inner side including the electrical connections.

6. The battery assembly of claim 5 wherein the cooling system further comprises at least one cooling tube attached to the battery cells to facilitate the transfer of thermal energy between the cooling system and the battery cells and wherein the cooling system is in fluid flow communication with the at least one cooling tube.

7. The battery assembly of claim 5 wherein the first plurality of linking members are secured to a flange formed on the first and second endplates that extends in a common plane with the linking members and is of the same height as the first and second end plates.

8. The battery assembly of claim 5 wherein the second plurality of linking members have an offset flange that is connected to the linking member by an intermediate portion that is perpendicular to the linking member and the offset flange, a plurality of stiffening ribs are formed at a corner defined by the intermediate portion and the offset flange, and wherein each offset flange is secured to a flange formed on the endplates that extends in a common plane with the offset flange and is disposed at a lower height than the linking members.

9. A method of manufacturing a battery for a vehicle comprising:
   stacking a plurality of pouch battery cells into a module;
   assembling a pair of end plates to at least one base linking member, the end plates each having a frame portion and a central portion defined by a partially spherical surface that spans the frame portion and protrudes inwardly towards the other end plate;
   stacking a plurality of the modules on the at least one base linking member to fill a space between the end plates;
   attaching at least one top linking member between the end plates to retain the two end plates at a predetermined distance apart; and
   loading the plurality of modules onto a battery holder in the vehicle after assembling the modules between the pair of end plates, stacking the modules on the base linking member, attaching the top linking member between the end plates, connecting the cells together electrically, and connecting the pouch battery cells to a cooling system interface.

10. The method of claim 9 wherein the modules have tabs that define openings and the loading step further comprises providing a tool that includes hooks that extend from the tool and are oriented to be received in the openings defined by the tabs on the modules, and wherein the method further comprises lifting the modules that are supported by the tool from above the modules.

11. The method of claim 10 wherein the tabs are distributed in an array to support the modules by tabs on a top side of the modules and by tabs on a front side of the modules.

12. The method of claim 9 wherein the battery holder is a tray that includes a plurality of weld studs, wherein the end plates define slots that are elongated in a direction that the linking members extend between the end plates, wherein the step of loading the plurality of modules onto the battery holder further comprises aligning a plurality of slots defined by the end plates with the weld studs on the tray to retain the modules on the tray.

13. The method of claim 9 further comprising the step of connecting the pouch battery cells together electrically on a first side of the plurality of modules.

14. The method of claim 13 further comprising the step of connecting at least some of the pouch battery cells to a cooling system interface on a second side of the plurality of modules from the first side that is opposite the first side.

15. The method of claim 13 further comprising the step of connecting at least some of the pouch battery cells to a cooling system interface on a second side of the plurality of modules that is opposite the first side.

* * * * *